INVENTOR.
ALBERT BOUWERS
BY
ATTORNEYS

United States Patent Office 3,195,404
Patented July 20, 1965

3,195,404
ANAMORPHOSING OPTICAL SYSTEM
Albert Bouwers, The Hague, Netherlands, assignor to N.V. Optische Industrie de Oude Delft, Delft, Netherlands
Filed Oct. 20, 1960, Ser. No. 63,836
Claims priority, application Netherlands, Oct. 20, 1959, 244,602
1 Claim. (Cl. 88—57)

The invention relates to prism anamorphosers. Anamorphosing systems, i.e. optical systems which have in one meridian of the field of view a magnification which is different from that in the meridian perpendicular thereto, are well known in the art. They are usually constructed as telescopic systems, i.e. systems having no resultant power, and are applied in combination with normal photographic and projection objectives in the so-called wide-screen cinematography.

Anamorphosing systems may be constructed of cylindrical or torical refracting or reflecting surfaces such as the surfaces of cylindrical lenses and mirrors, or they may consist of wedge-shaped prisms. It is the primary object of the present invention to provide a novel anamorphosing system of the type using prisms and which exhibits a new and useful effect on incident light rays.

In accordance with the invention the anamorphoser comprises a wedge-shaped prism inclined to the optical axis and a plane reflecting surface disposed on one side of the prism and parallel to the refracting edge thereof so as to reflect light rays having traversed said prism back into said prism whereby the prism is traversed twice by said light rays and said optical axis is deviated by the combination of said reflecting surface through an angle exceeding 45°.

In conventional prism anamorphosers it is usually attempted to make a straight vision system i.e. one in which the optical axis, that is the principal ray from the central point of the field, is not angularly deviated when traversing the system. In the anamorphoser according to my present invention the prism which is traversed twice by the light rays not only anamorphoses the incident beams of light rays but also deliberately bends or folds the optical axis of the system through an angle of at least 45° in the anamorphotic meridian. This is a novel effect which entails certain new and useful applications for prism anamorphosers of which one will be described in detail hereinafter.

The anamorphoser according to the invention may be very simple in construction and requires a minimum of space. In a preferred embodiment the reflecting surface is disposed on one of the side faces of the prism, e.g. by depositing a reflective coating on said surface.

As is well-known the deviation caused by prisms varies with the angle of incidence of the light rays. Accordingly, prism anamorphosers in principle have an anamorphotic factor, i.e. the ratio to which the image is compressed or expanded, which varies throughout the field of view to a certain extent. In order to obtain an anamorphotic ratio in the system of the invention which is to a satisfactory degree constant throughout the field of view, there can be arranged in the path of the light rays, at least one additional wedge-shaped prism whose refracting edge is parallel to that of the first prism and whose base is disposed opposite to that of the first prism relative to the optical axis. The additional prism is arranged on the side of the first prism remote from the reflecting surface and is traversed once by the light rays. By suitably selecting the apex angles, the positions and the materials of the prisms it is possible to secure that the variation in magnification of one of the prisms is at least partly compensated by opposite variations in the other prism, whereas the prisms together provide the required anamorphotic expansion or compression and bend the optical axis through the desired angle.

In the annexed drawings—

Figure 1:
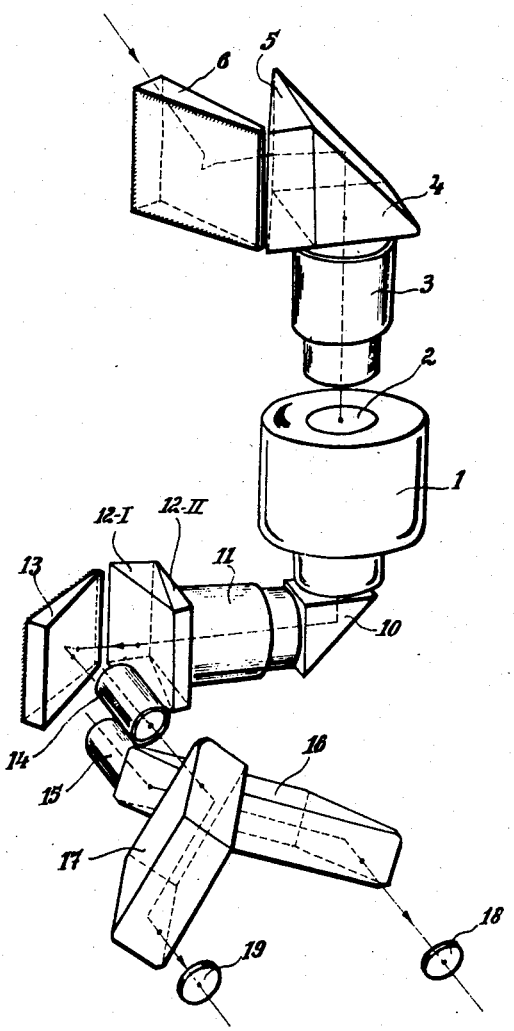
FIG. 1 is a perspective view of a periscope which is provided with a set of anamorphosers in accordance with the invention.

In FIG. 1 the housing of the periscope and all other parts which take no part in the optical imagery have been omitted for the sake of clarity. The figure shows a periscope which is provided with an image converter, such as used in military vehicles for use at night or in foggy weather. The vehicle carries infra-red illuminating means which flood the scene in front of the vehicle with infra-red light. The periscope has a radiation collecting optical system which includes a reflective surface bending the path of rays vertically and an objective. This optical system will be termed hereinafter the front optical system as, in the path of the light rays, it is in front of the image converter. The front optical system projects an infra-red image on the photo-cathode of an image converter which is accommodated in the vertical part of the periscope. The image converter converts this infra-red image into a visible image on the fluorescent screen of the tube which may be viewed through a magnifying optical system, hereinafter to be termed the rear optical system.

In my copending patent application Serial No. 63,898 filed October 20, 1960, concurrently herewith I propose to increase the horizontal field of viewing instruments such as the periscopes mentioned here without modifying the image converter and the front objective by adding to the front optical system and the rear optical system prism anamorphosers such that a horizontally compressed image is formed on the photo cathode of the image converter and the image is expanded again by the anamorphoser in the rear optical system. A problem in this connection is to so construct the anamorphosers that the periscopes can still be accommodated in the relatively small spaces which in vehicles are available to that purpose, particularly as regards their vertical dimension. By applying the prism anamorphoser according to the present invention these difficulties may be solved in a simple and convenient way.

In FIG. 1 the image converter is designated 1. On the photo cathode 2 thereof an anamorphotic image is formed by a radiation collecting front optical system consisting of a very luminous object 3 having e.g. a symmetrical field of 27°, a 45°-prism 4 whose hypotenuse surface bends the optical axis through 90° downward and a prism anamorphoser according to the invention and made up of the prisms 5 and 6. The edges of prisms 5 and 6 are perpendicular to those of prism 4.

Figure 2:
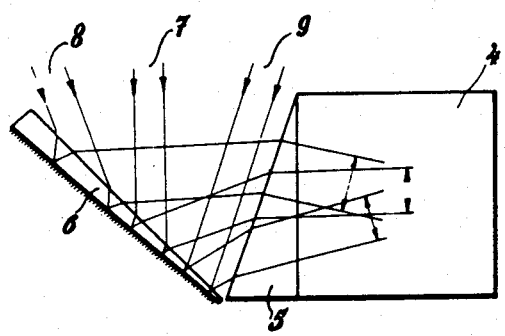
FIG. 2 is a top plan view of one of the anamorphosers of FIG. 1.

The function of the anamorphosing system 5 and 6 may best be seen from FIG. 2 which is a top plan view of the anamorphoser in combination with the 45°-prism 4. The prism 6 has a very small apex angle and is disposed at an angle of substantially 45° with respect to the optical axis beside the 45°-prism 4. The prism 5 has a larger apex angle and has its base opposite to that of the prism 6, relative to the optical axis. The prism 5 has its exit surface which is perpendicular to the optical axis cemented against the entrance surface of the prism 4.

In FIG. 2 there are shown three pencils of light rays of equal width, 7, 8 and 9 which all travel in the horizontal meridional plane. The pencils 7, 8 and 9 originate from the center and the two borders of the field, respectively, and have angles between them of 20°. The pencils are refracted when entering at the front surface of the prism 6 and are reflected at the rear surface of the prism which is coated with a reflecting layer. Thus they have to traverse the prism 6 twice and are then refracted again by the front surface of the prism. It may be easily seen that the emerging pencils are substantially wider than the entering pencils and that such anamorphosing effect is strongest for the pencil 8 which of the three pencils shown has the largest angle of incidence on the front surface and also undergoes the largest deviation, i.e. more than 100°. The pencils then enter the second prism 5 and, due to this prism being oppositely arranged, their width is increased still more whereas the angles between the pencils are again decreased. The pencil 8, however, has now the smallest angle of incidence and pencil 9 the largest. Consequently, the effect of the unequal deviations and anamorphotic magnifications is at least partly compensated for by the prism 5. The angle between the outer pencils of rays 8 and 9 when entering the prism 4, is equal to the effective field angle of the objective 3, i.e. substantially 27°. Accordingly, the anamorphotical factor of the prism anamorphoser is 1.5.

It will be understood that the reflecting surface need not be disposed on the rear surface of the prism 6. Alternatively, a separate mirror may be accommodated behind the prism provided that it is sufficiently near to the prism to reflect the light rays back into the same. The mirror should be parallel to the refracting edge of the prism but need not be strictly parallel to the back surface of the prism.

The exit surface of prism 5 is perpendicular to the optical axis which is diagrammatically shown in FIG. 1. However, this prism may be inclined to the optical axis as well, e.g. in order to increase its anamorphosing effect. The resultant horizontal deviation of the optical axis by the anamorphosing system 5, 6 is 90°. However, as the prism 5 deviates the optical axis too, the deviation given by the mirror-prism 6 is smaller than 90°. It will be understood that in order to properly function as an anamorphosing device the prism 6 should be disposed suitably inclined to the optical axis, such that all of the light rays after having traversed the prism twice emerge at a substantial angle relative to the respective entering light ray. In view of the anamorphotic magnifications and field angles required in practice I consider 45° as a reasonable minimum deviating angle for the optical axis.

It will be evident that the prisms 5 and 6 in the form shown may introduce chromatic aberrations if the light which is to be transmitted by the anamorphoser covers a spectral region of substantial width. Such chromatic error may be reduced by suitably selecting the Abbe numbers of the prisms 5 and 6 or by achromatizing each of these prisms individually. In the present case however, the infra-red radiations which may be suitably filtered when entering the periscope is sufficiently monochromatic such that it is not necessary to make either or both of the prisms in the form of doublets.

The anamorphosed image on the fluorescent screen of the image converter tube 1 is viewed through a magnifying rear optical system which provides for binocular viewing of the image. It will be understood that the image on the screen will generally be circular, all objects in the image however appearing to be compressed in their horizontal dimension. In order to offer a normal image to the operator the circular image must be expanded by the rear optical system to an elliptical image. This optical system consists of a 45°-prism 10, an objective 11 having a large absolute and relative aperture, a prism anamorphoser consisting of the doublet prism 12 and the prism 13 whose rear surface is made refractive a pair of parallel telescope objectives 14 and 15, rhomboid prisms 16 and 17 and eye pieces 18 and 19 which have been illustrated only diagrammatically. The focal plane on the object side of the objective 11 coincides with the image screen of the tube 1 and consequently the pencils of light rays which emerge from this objective are parallel. The objective 11 for this reason will be termed collimating objective hereinafter. The fluorescent screen of the tube 1 is imaged at infinity by the objective 11 and the infinite image is observed through a binocular telescope consisting of the objectives 14 and 15, the rhomboid prisms 16 and 17 which serve to bring the telescope axes at the interpupillary distance in a horizontal plane, and the eye pieces 18, 19.

Figure 3:
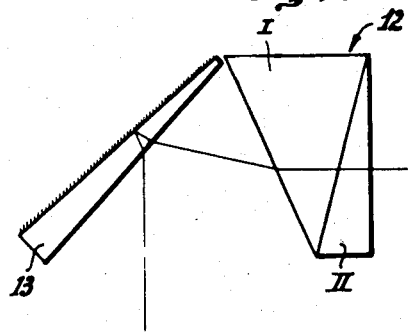
FIG. 3 is a similar view of the other anamorphoser of FIG. 1.

The parallel beams between the collimating objective 11 and the telescope objectives 14, 15 entail the opportunity to accommodate in the rear optical system a prism anamorphoser 12, 13 in accordance with the invention which not only restores or de-anamorphoses the fluorescent image but also bends the optical axis through 90° towards the observing telescope. The function of the prism anamorphoser which is shown in top plan view in FIG. 3 is similar to that of the anamorphoser in the front optical system but the path of light rays is reversed and so is the anamorphosing effect. The anamorphotic factor is of course equal to 1.5. In view of the chromatic aberrations the prism 12 is now made in the form of a cemented doublet, it being understood that the fluorescent light emitted by the image screen of tube 1 will comprise wave lengths of 5000 to 6000 A.

The optical data of the anamorphosing systems of FIGURES 2 and 3 are as follows:

| Prism | Apex Angle | Glass | |
|---|---|---|---|
| | | $n_d$ | Abbe number |
| 5 | 20°3' | 1.785 | 25.71 |
| 6 | 6° | 1.526 | 60.09 |
| I | 40° | 1.620 | 60.29 |
| 12 { II | 16°17' | 1.620 | 36.34 |
| 13 | 6° | 1.517 | 64.20 |

The angle of incidence of the optical axis on prism 6 is 47°. The angle of refraction of the optical axis when leaving prism 13 is likewise 47°. The axial ray enters prism 12 perpendicularly. Suppose that the horizontal field is 40° in the anamorphoser 5, 6 and 26° in the anamorphoser 12, the anamorphotic magnifications of each of the systems in the center and the borders of the field are:

| | Center | Borders | |
|---|---|---|---|
| System 5, 6 | 1.4 | 1.6 | 1.8 |
| System 12, 13 | 1.45 | 1.55 | 1.6 |

The resulting anamorphotic magnification in the final image observed through the binocular telescope varies between 0.97 in the center of the field and 1.02 and 1.11 respectively, at the edges of the field.

FIG. 1 clearly illustrates the surprisingly compact construction of the anamorphotic periscope, particularly its small height, and the relatively simple optical means required to provide the desired eye piece position and direction and the correct image orientation, when using prism anamorphosers according to the invention.

What I claim is:

In an optical system for forming a real image of a scene, in combination, an optical objective having an optical axis, and a prism anamorphoser disposed on the long conjugate side of said objective, said anamorphoser including first and second wedge-shaped prisms disposed in the form of a V and having parallel refracting edges oppositely arranged so that the base of the first prism and the apex of the second form the V apex, the first prism having one surface substantially perpendicular to the optical axis, the second prism being inclined to the optical axis and disposed on the side of said first prism remote from said objective, and having a plane reflecting surface on the side remote from said first prism, so as to reflect incident light rays having traversed said second prism back into the same whereby said second prism is traversed twice and said first prism is traversed once by such light rays, said optical axis being deviated by said anamorphoser through an angle of between 60° and 120°.

References Cited by the Examiner

UNITED STATES PATENTS

| | | | |
|---|---|---|---|
| 1,787,269 | 12/30 | Hansen | 88—1 |
| 2,338,488 | 1/44 | Brown | 88—1 X |
| 2,861,172 | 11/58 | Mandler | 240—1 |

JEWELL H. PEDERSEN, *Primary Examiner.*

EMIL G. ANDERSON, *Examiner.*